United States Patent [19]
Kai et al.

[11] Patent Number: 4,615,094
[45] Date of Patent: Oct. 7, 1986

[54] METHOD AND APPARATUS FOR AUTOMATICALLY ATTACHING CLIPS TO WEATHER STRIPS

[75] Inventors: Toru Kai, Inazawa; Norihisa Kubo, Ichinomiya, both of Japan

[73] Assignee: Toyoda Gosei Co., Ltd., Nishikasugai, Japan

[21] Appl. No.: 725,628

[22] Filed: Apr. 22, 1985

[30] Foreign Application Priority Data

Apr. 30, 1984 [JP] Japan .................................. 59-086956

[51] Int. Cl.[4] .................... B23Q 17/00; B23P 21/00
[52] U.S. Cl. .................................... 29/407; 29/718
[58] Field of Search ................ 29/407, 705, 701, 709, 29/714, 717, 718

[56] References Cited

U.S. PATENT DOCUMENTS

| | | | |
|---|---|---|---|
| 3,199,180 | 8/1965 | Driscoll et al. | 29/208 |
| 3,707,026 | 12/1972 | Kopczynski | 29/718 |
| 3,750,256 | 8/1973 | Elmer | 29/718 |
| 3,765,075 | 10/1973 | Olney et al. | 29/718 |
| 4,412,640 | 11/1983 | Sugiyama et al. | 29/701 |

Primary Examiner—Howard N. Goldberg
Assistant Examiner—Steven Nichols
Attorney, Agent, or Firm—Cushman, Darby & Cushman

[57] ABSTRACT

A method and apparatus for automatically attaching clips to a weather strip for an automobile. The clip attaching apparatus comprises a guide rail for supporting an elogated weather strip with a plurality of clip holes arranged in the axial direction thereof and guiding said weather strip in the axial direction thereof, a transport means for causing said weather strip to move and stop along said guide rail, a hole detection means disposed along said guide rail for detection a hole of the weather strip, a clip insertion means for inserting a clip into a hole of said weather strip, and a control unit for controlling the operation of the various means. Thus the operations for attaching clips can be completely automated.

12 Claims, 8 Drawing Figures

METHOD AND APPARATUS FOR AUTOMATICALLY ATTACHING CLIPS TO WEATHER STRIPS

BACKGROUND OF THE INVENTION

1. Field of the Invention

The present invention relates to a method and apparatus for automatically attaching clips to a weather strip.

A weather strip is interposed between a body and a door of an automotive vehicle to seal the space therebetween so that water and noise are prevented from intruding into the body and impact caused when the door is opened or closed as well as vibration caused when an automotive vehicle is running can be absorbed. In order to attach a weather strip to a door, clips are attached to the weather strip and are engaged with corresponding engaging holes of the door.

Therefore in order to attach or insert clips into a weather strip, holes are punched or otherwise formed in an elongated weather strip at a correct pitch and clips must be inserted into these holes.

2. Brief Description of the Prior Art

So far there has been employed the following conventional method for attaching clips to a weather strip. First an elongated weather strip is simultaneously formed with holes by means of a perforator with a plurality of drills spaced apart from each other by a predetermined pitch. Thereafter, clips are manually inserted into the holes of the weather strip. As a result, in order to attach clips to a weather strip, many labors and many steps are required so that there arises the problem of production efficiency.

SUMMARY OF THE INVENTION

The present invention was made to overcome the above and other problems and has for its object to provide a method and apparatus for automatically attaching clips to a weather strip.

A method for automatically attaching clips to a weather strip in accordance with the present invention comprises the steps of forming a plurality of holes in predetermined spaced apart relationship in an elongated weather strip in the axial direction thereof; guiding the weather strip with a plurality of holes formed by the hole-punching step along a guide rail; detecting one of said holes of the weather strip being guided to stop said weather strip at a predetermined position; and inserting a clip into said one of said holes of the weather strip held stationary.

According to the method of the present invention, a clip insertion hole of a weather strip is detected and a clip is automatically inserted therein. Therefore, any manual operation can be eliminated and the clips can be positively attached. Furthermore, the detection of clip holes is carried out electrically so that it becomes simple to provide an inspection step to automatically control holes which are not needed to be inserted with clips.

An apparatus for attaching clips to a weather strip in accordance with the present invention comprises a guide rail for supporting an elongated weather strip with a plurality of clip holes arranged in the axial direction thereof and guiding said weather strip in the axial direction thereof; a transport means for causing said weather strip to move and stop along said guide rail; a hole detection means disposed along said guide rail for detecting one of said holes of said weather strip; a clip insertion means for inserting a clip into said one of said holes of said weather strip; and a control unit for controlling the operation of said various means, repeating the operations of transporting a weather strip, detecting a hole and inserting a clip into the detected hole in a predetermined sequence and controlling the insertion of a clip into a predetermined hole of a weather strip.

With the clip attachment apparatus in accordance with the present invention, it becomes possible to transport a weather strip along a guide rail and to advance the hole detected by the hole detection means to a predetermined position of the clip insertion means. Furthermore, the detection of holes is carried out electrically so that an inspection means can be added and consequently a substantially full automated apparatus for attaching clips to a weather strip can be provided.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference characters designate the same or similar parts throughout the figures thereof and wherein.

DETAILED DESCRIPTION OF THE INVENTION

The method and apparatus of the present invention concern the attachment of weather strips. Therefore the method and apparatus in accordance with the present invention will be described in combination as a present invention.

Figure 2:
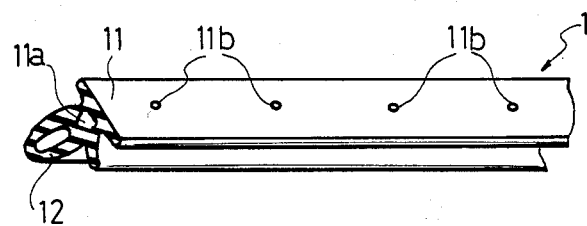
FIG. 2 is a fragmentary perspective view of a weather strip to which are attached clips.

A weather strip 1 used in the present invention is interposed between a door of an automotive vehicle and an automotive body and, as shown in fragmentary perspective view in FIG. 2, comprises a base portion 11 and a lip-shaped seal portion 12 formed at one end of the base portion 11. The base portion 11 is formed with an axially extended center hole 11a. Clip holes 11b are formed at the bottom of the base portion 11 and are communicated with the center hole 11a. In the step of forming clip holes 11b, it is preferable that a weather strip is extended along a base stand and then required clip holes 11 are simultaneously formed. A conventional device and method may be used to form clip holes into a weather strip. When slip holes are punched or otherwise formed one at a time while a weather strip is being transported along a guide rail, errors in distance between the adjacent clip holes tend to occur frequently because the weather strip is soft and tends to be elongated. Such errors in distance between the adjacent clip holes can be eliminated by simultaneously punching or otherwise forming clip holes. It is to be noted that clips are not inserted into all the clip holes and that some of the clip holes are used as engaging holes for securely engaging with projections extended from a body.

A weather strip in accordance with the present invention is cut into a predetermined length as needs demand, but in some cases a continuous weather strip may be used.

Figure 3:
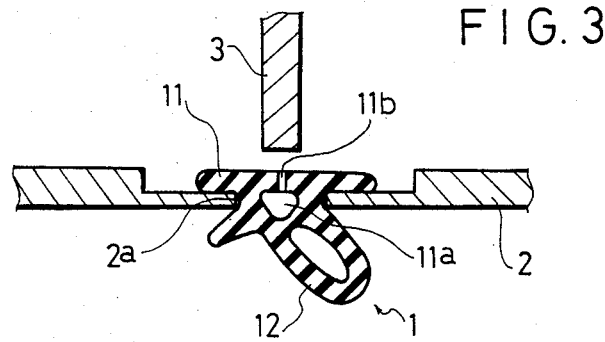
FIG. 3 is a fragmentary sectional view illustrating how a clip hole is detected.

As shown in FIG. 3, a clip hole detection method is such that the position of a clip hole 11b on the weather strip 1 which is held at the neck formed between the base portion 11 and the seal portion 12 and is transported rectilinearly in a slit 2a of a guide rail 2 is detected by a hole detection means 3 such as a photosensor adapted to intercept the light reflected back from the clip hole 11b. When light is used in detecting clip holes 11b, a photocell intercepts the light reflected back from the back surface of the base portion 11 of the weather strip 1 and the position of a hole can be detected by detecting the quantity of light which varies when light is projected at a hole. Instead of an optical means, a mechanical means may be used as a hole detection means. For instance, a contact finger is made into light contact with the bottom surface of the base portion and a hole can be detected as the contact finger is inserted into a hole while a weather strip is being transported. Any conventional detection method and means may be used.

After the position of a hole has been detected, the weather strip is stopped at a predetermined position. The position at which the weather strip is stopped coincides with the position at which a clip is inserted into a hole.

In some cases, it is not needed to insert a clip into a hole. In these cases, in response to a decision derived from an electrical control device (to be described in detail hereinafter), the hole detection means determines whether a clip is inserted into a hole or not. If it is not needed to insert a clip into a detected hole, the weather strip is kept transported until a hole into which a clip must be inserted is detected.

Figure 4:
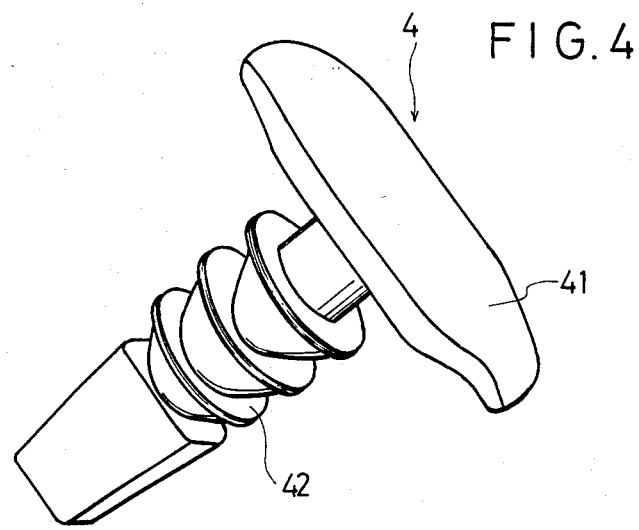
FIG. 4 is a perspective view of a clip.

An automatic clip insertion means is used to insert a clip into a hole. The automatic clip insertion means is provided with a clip feed means. As best shown in FIG. 4, a clip 4 is in the form of T as a whole and the horizontal bar or line of a letter T corresponds to the head 41 of the clip which is inserted into a clip hole. The leg portion 42 comprises a three tier of umbrella- or cone-shaped portions and is inserted into a predetermined hole of a body and securely held therein.

A conventional part feed means may be used as a clip feed means and clips arranged in one row in a predetermined direction are fed sequentially one by one. In order to ensure the positive feed of clips, it is preferable to provide a detection means capable of positively detecting weather or not a clip at a predetermined position is fed. An optical means may be used as this detection means.

Figure 5:
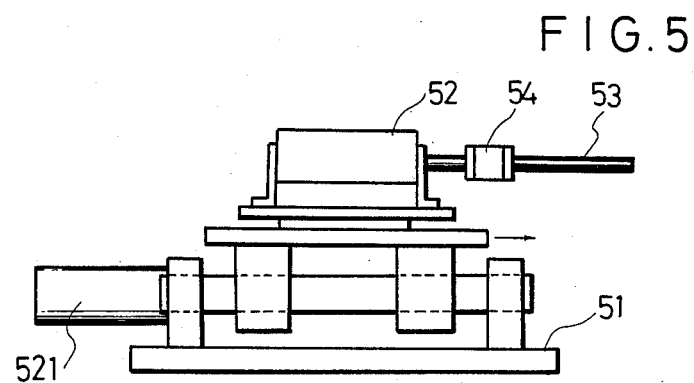
FIG. 5 is a complete side view of a clip insertion means.
Figure 6:
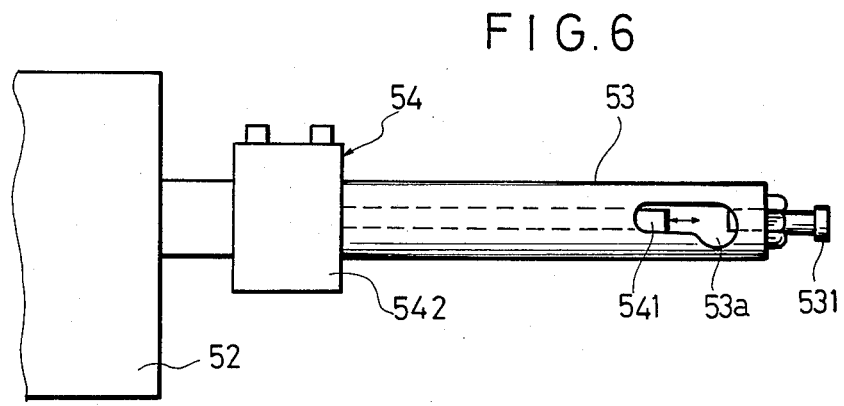
FIG. 6 is a fragmentary view, on enlarged scale, of the clip insertion means.
Figure 7:
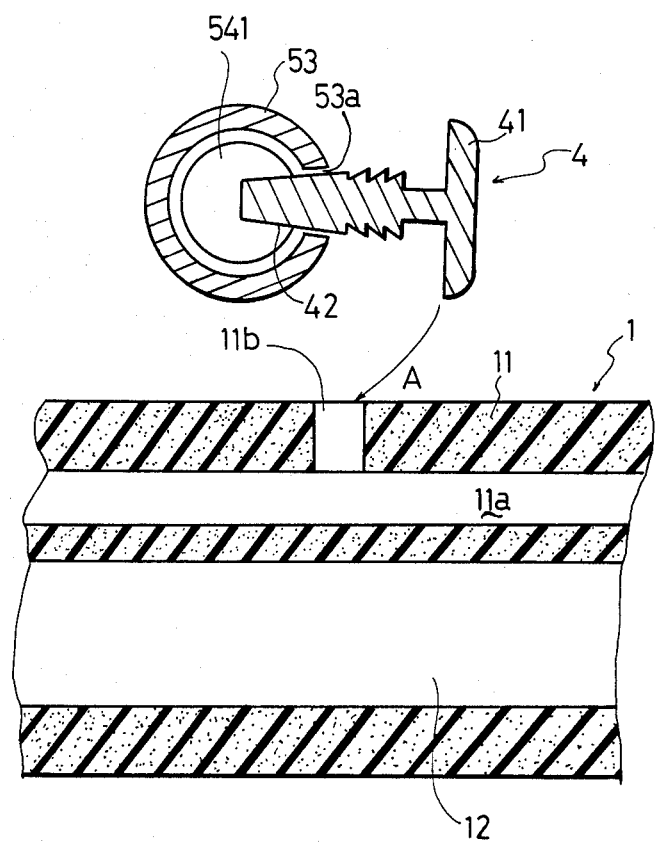
FIG. 7 is a view used to explain how a clip is inserted.

A device as shown in FIGS. 5 and 6 may be used as a clip insertion means 5. The clip insertion means 5 comprises a main body 52 which is reciprocably mounted on a base 51, a rotating shaft 53 rotatably carried by the main body 52 and a clip retaining means 54 securely mounted on the rotating shaft 53. A rotary means (not shown) is disposed within the main body 52 so as to cause the rotating shaft 53 to rotate about its axis. The main body 52 is forced to move forwardly or backwardly by means of an air cylinder 521 and the advanced position corresponds to the position at which a clip is inserted into a hole while the retracted position corresponds to the position at which a clip is fed. The rotating shaft 53 is in the form of a tube and has a screw-like stopper 531 attached at the leading end thereof and a clip retaining hole 53a formed through the cylindrical surface thereof adjacent to the leading end thereof. The clip retaining member 54 comprises a piston 541 which is extended through the axial hole of the rotating shaft 53 and is movable in the axial direction of the rotating shaft 53 and an air cylinder 542 for extending or retracting the piston 541. A clip is clamped between the leading end of the piston 541 and the stopper 531. In order to retain or clamp a clip, first the air cylinder 521 drives the main body 52 of the clip insertion means 5 to the retracted position and the air cylinder 542 causes the piston 541 to move backwardly. Thereafter the clip feed means inserts the leg portion 42 of the clip 4 into the retaining hole 53a and then the air cylinder 54 causes the piston 541 to move forwardly so that the leg portion 42 is clamped between the leading end of the piston 42 and the stopper 531. Next the air cylinder 521 drives the main body 52 to the advanced position. Thus the clip 4 is positioned relative to the weather strip 1 as shown in FIG. 7. Next the rotary means (not shown) in the main body 52 causes the rotating shaft 53 to rotate so that the head 41 of the clip 4 is caused to swing in the direction indicated by the arrow A in FIG. 7. As the rotating shaft 53 rotates, one end of the head 41 of the clip 4 is inserted into the clip hole 11b and then into the axial hole 11a of the base portion 11 of the weather strip 1. As the rotating shaft 53 is further rotated, the head 41 of the clip 4 causes the elastic deformations of the clip hole 11b, thereby enlarging the same. As a result, the whole head 41 is inserted into the clip hole 11b and then into the axial hole 11a.

Under these conditions, the piston 541 is retracted so that the clip 4 is separated from the retaining member 54 and consequently the clip 4 is securely held in position in the clip hole 11b and the axial hole 11a of the weather strip 1. Thereafter the rotating shaft 53 is returned to its initial position and receives the next clip from the clip feed means.

Under these conditions, a drive means is energized so that the weather strip is transferred to the next step. the drive means will be described in detail hereinafter.

The next step may be an inspection step. In the inspection step, it is detected whether or not a clip is positively inserted into a clip hole. As in the case of the clip hole detection means, an optical means may be used as a detection means. More particularly, the constant light is emitted and the quantity and position of the reflected light vary depending upon whether a clip is inserted into a clip hole completely or incompletely. Therefore, the reflected light is detected and the position (relative to the weather strip) and quantity of reflected light are determined by means of a computer or the like.

The above-described steps for detecting a clip hole and inserting a clip into the detected clip hole or the steps for detecting a clip hole, inserting a clip into the detected clip hole and inspecting whether the clip is completely inserted into the detected clip hole or not may be sequentially carried out in such a way that after one step has been completely carried out, the next step is carried out. Furthermore, the whole control system may be fed into a computer so that all the steps may be controlled by the computer.

The features and advantages of the present invention is summarized below.

In the method and apparatus in accordance with the present invention for automatically attaching clips to a weather strip, first a clip hole of a weather strip is detected; the detected clip hole is held stationary at a predetermined position; and a clip is automatically inserted into the clip hole. Therefore the operations for attaching clips can be completely automated. Furthermore, the inspection step can be incorporated so that only a weather strip with the clips correctly inserted into the predetermined clip holes can be shipped as a product. As a result, high productive and reliable production becomes possible.

Moreover, according to the method and apparatus of the present invention, there is an advantage that a conventional method and apparatus for simultaneously punching or otherwise forming all the required clip holes in a weather strip can be used. According to a conventional method and apparatus for simultaneously punching or otherwise forming all the required clip holes in a weather strip, the clip holes are punched or otherwise formed with a high degree of accuracy. According to the method and apparatus of the present invention, clips can be inserted or attached into or on a weather strip with clip holes positioned with an extremely high degree of accuracy so that the present invention can provide extremely high quality weather strips with clips.

DETAILED DESCRIPTION OF THE PREFERRED EMBODIMENT

Figure 1:
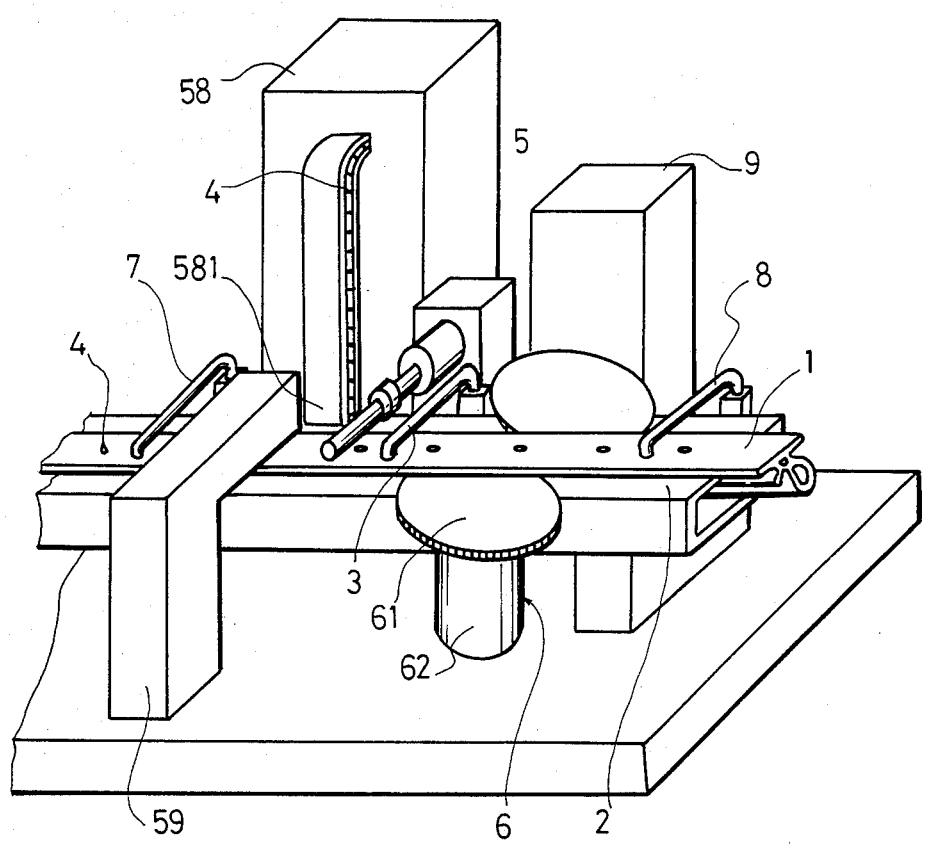
FIG. 1 is a complete perspective view of a preferred embodiment of a device for automatically attaching clips to a weather strip in accordance with the present invention.

FIG. 1 is a complete perspective view of a preferred embodiment of an automatic clip attachment device in accordance with the present invention. The automatic clip attachment device comprises a guide rail 2, a transport means 6 incorporated integral with the guide rail 2, a hole detection means 3 disposed upwardly of the guide rail, a clip insertion means 5 disposed adjacent to the guide rail 2, a clip feed means 58 for feeding clips 4 to the clip insertion means 5, an inspection means 7 for inspecting the insertion of a clip, a detection means 8 for detecting the leading and trailing ends of a weather strip 1 and a control unit 9. The guide rail 1 has a center or axially extended slit 2a whose width is slightly greater than the thickness of the neck portion of the weather strip 1. The slit 2a is defined by a pair of opposed sides. The transport means 60 comprises two feed rollers 61 disposed on the opposite sides, respectively, of the guide rail 2 and a motor 62 for driving the feed rollers 61. The cylindrical surface of each feed roller 61 has teeth in order to prevent the slippage between the feed roller 61 and the weather strip 1. The weather strip 1 is clamped at its neck between the feed rollers 61 and is transported on the guide rail 2 from the right to the left in FIG. 1. The hole detection means 3 comprises a light emitting and intercepting unit consisting of a light emitting diode and a photosensor and a cable connected to the light emitting and intercepting unit and consisting of thousands of optical fibers. As best shown in FIG. 3, the leading end of the optical cable is located about the center or axially extended slit 2a of the guide rail 2. The clip insertion means 5 is substantially similar to that described above with reference to FIGS. 5 and 6. The clip feed means 58 arranges laterally directed or oriented clips 4 in one row so that the clips 4 are supplied one at a time from the lower end of a feed passage 581 to the clip insertion means 5. The clip feed means 58 may be a conventional one available in the market. In this embodiment, there is provided a photosensor in order to detect whether a clip 4 is fed to the outlet at the lower end of the feed passage 58. The automatic clip attachment device in accordance with the present invention is further provided with a clamping means 59 adapted to press the weather strip 1 against the guide rail 2 and the clamping means 59 straddles the guide rail 2. The weather strip 1 is clamped between the guide rail 2 and a pressure pin (not shown) of the clamping means 59 so that the weather strip 1 is securely pressed against the guide rail 2. The clip-insertion-detection means 7 is disposed beyond the clip insertion means 5. The inspection means 7 is substantially similar in construction and mode of operation to the hole detection means 3. The leading-and-trailing-edge detection means 8 is disposed at the front end of the guide rail 2 and when the weather strip 1 prevents the light from reaching the photosensor, the weather strip 1 is detected as being on the guide rail 2, and vice versa.

Figure 8:
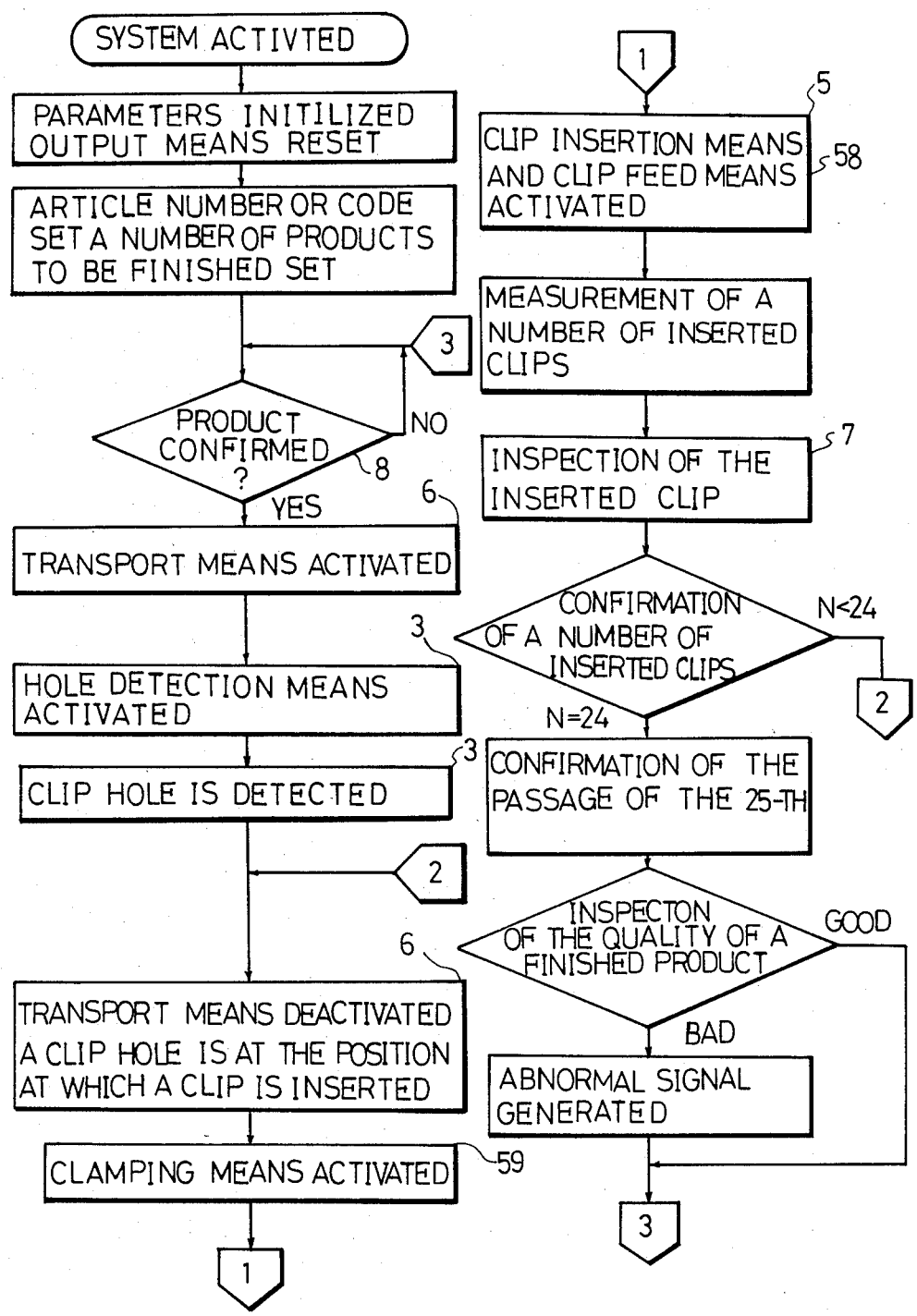
FIG. 8 is a flowchart of a control unit.

The control unit 9 consists of a computer system including a CPU, RAMs, etc. The control unit 9 has an article number setting switch for setting a kind of a weather strip, a switch for setting a number of weather strips to be finished and interfaces between these switches and the CPU. In addition, the control unit 9 further includes a display for displaying whether a finished product should be passed or rejected, another display for displaying a number of finished products and interfaces between these displays and the CPU. Furthermore, the control unit 9 is connected through interfaces to the leading-and-trailing-edge detection means 8, the hole detection means 3, the inspection means 7 for sensing weather a clip is correctly inserted into a clip hole and the clip feed means 58 in order to receive the signals from them. In the control unit 9, the signals from respective sensors are processed by CPU in order to energize or deenergize the pulse motor 62 of the transport means 6, to drive the clip insertion means 5 and to activate or deactivate the clamping means 59. FIG. 8 shows the flowchart of the control unit 9. The system is activated; parameters are initialized; and output means are reset. Thereafter an article number or code of products and a number of finished products are set. Next the leading-and-trailing-end sensing means 8 at the front end of the guide rail 2 generates a signal representative of the presence or absence of a weather strip 1 and when the supply of a product is confirmed, the transport means 6 is energized so that the weather strip 1 is transported along the guide rail 2. In this case, the control unit 9 controls the rotational speed of the pulse motor 9, thereby controlling the displacement of the weather strip 1 on the guide rail 2. When the weather strip 1 reaches the hole detection means 3, the optical cable emits light to a clip hole 11b and the quantity of the light reflected back from the clip hole 11b varies. The variation of reflected light is processed by the control unit 9, whereby it is confirmed that the clip hole 11b is located at a predetermined position. Then the signal representative of the passage of the first hole is generated and the transport means 6 transports the weather strip 1 by a predetermined distance and holds it stationary. Concurrently, the clamping means 59 is activated so that the pressure pin at the leading end of the clamping means 59 presses the weather strip 1 on the guide rail 2, thereby securely holding it in position. Thereafter the clip insertion means 5 and the clip feed means 58 are activated. When the clip insertion means 5 is returned to its initial position after a clip 4 has been inserted into the clip hole 11b, the clamping means 59 is activated to release the weather strip. Thereafter the transport means 6 further transports the weather strip 1. Then the clip-insertion inspection means 7 inspects the position at which the clip 4 is inserted and the state of the inserted clip 4 by means of its optical sensor. In this embodiment, 24 clips 4 are continuously inserted into 24 clip holes 11b, respectively, and it is so programmed that no clip is inserted into the 25-th clip hole. It follows therefore that after the passage of the 25th hole has been confirmed, whether the quality of a finished product is good or bad is determined. More particularly, when a predetermined reflected light is not obtained from each of 25 clip holes 11b, a finished product is detected as having defects so that an alarm lamp is turned on. When a finished weather strip is detected as good, "1" is displayed by the number-of-finished-products display. Thereafter the next weather strip is fed and clips are attached thereto in a manner substantially similar to that described above.

The device which has been described as a preferred embodiment of the present invention has the above-described construction. The automatic clip attachment device can automatically insert clips 4 into clip holes 11b of a weather strip. Therefore the production efficiency is extremely high. Furthermore the insertion of a clip 4 can be checked by the sensor so that a problem of forgetting to insert clips into their predetermined clip holes can be eliminated.

Obviously, many modifications and variations of the present invention are possible in the light of the above teachings. It is therefore to be understood that within the scope of the appended claims, the invention may be practiced otherwise than as specifically described.

What is claimed is:

1. A method of attaching clips having a head portion to an elastic weather strip having a base portion connected to a seal portion by a neck portion, the base portion being provided with a longitudinal opening therein and a plurality of equally longitudinally spaced clip-receiving holes extending into the opening and of lesser size than the largest transverse dimension of the head portion of the clips, the steps comprising:
    guiding the neck portion of the strip for longitudinal movement thereof between spaced guide rails with the base portion spanning and slidably resting on the rails;
    moving the strip along the rails;
    detecting a hole in the moving strip base portion;
    automatically moving the strip a predetermined distance in response to the detecting step and then stopping the movement; and
    automatically inserting a clip head first in the detected hole while the strip is stopped.

2. The method defined in claim 1 including the step of automatically pressing the base portion onto the guide rails adjacent the detected hole while the strip is stopped.

3. The method defined in claim 1 including the step of automatically resuming movement of the strip after the inserting step.

4. The method defined in claim 3 including the step of automatically discontinuing the pressing step on completion of the inserting step.

5. The method defined in claim 1 including the step, following the resumption of movement step, of automatically inspecting the detected hole to determine whether or not a clip has been properly inserted therein.

6. The method defined in claim 1 wherein the inserting step is accomplished by rotating the clip about an axis transverse thereto and remote from the head portion so that the latter penetrates the hole and stretches it sufficiently to allow passage of the head portion therethrough into the longitudinal opening in the base portion.

7. The method defined in claim 6 wherein the head portion is T-shaped and one end thereof initially penetrates the hole.

8. The method defined in claim 4 including the step of forming the holes in the base portion simultaneously.

9. Apparatus for attaching clips having a head portion to an elastic weather strip having a base portion connected to a seal portion by a neck portion, the base portion being provided with a longitudinal opening and a plurality of equally longitudinally spaced clip-receiving holes extending into the opening and of lesser size than the largest transverse dimension of the head portion of the clip, comprising:
    spaced guide rails for receiving therebetween the neck portion of the strip with the base portion thereof slidably resting on the rails;
    means for moving the strip longitudinally along said rails;
    means for detecting a hole in the strip while moving;
    means responsive to said detecting means for operating said moving means to move the strip a predetermined distance beyond said detecting means and then stopping the movement;
    means responsive to operation of said moving means to stop movement for inserting a clip head first into the detected hole while the strip is stopped; and
    means responsive to operation of said inserting means for operating said moving means to resume movement of the strip after a clip has been inserted.

10. The apparatus defined in claim 9 including means adjacent the inserting means responsive to operation of the moving means to stop movement to press the base portion onto the rails and responsive to operation of said inserting means to release the base portion from said rails after a clip has been inserted.

11. The apparatus defined in claim 9 including means located along the rails beyond the inserting means for inspecting a detected hole to determine whether or not a clip has been properly inserted therein.

12. The apparatus defined in claim 9 wherein the inserting means includes means for removing a clip from a supply thereof, advancing the clip to locate the head portion thereof above the detected hole and rotating the clip about a transverse axis remote from the head portion to insert the latter into the hole and stretch it sufficiently to allow passage therethough of the head portion into the opening in the base portion.

* * * * *